US009240832B2

(12) United States Patent
Sadler

(10) Patent No.: US 9,240,832 B2
(45) Date of Patent: Jan. 19, 2016

(54) METHOD AND APPARATUS FOR SIGNAL DETECTION

(75) Inventor: David James Sadler, Hampshire (GB)

(73) Assignee: Roke Manor Research Limited, Romsey Hampshire (GB)

(*) Notice: Subject to any disclaimer, the term of this patent is extended or adjusted under 35 U.S.C. 154(b) by 555 days.

(21) Appl. No.: 13/602,992

(22) Filed: Sep. 4, 2012

(65) Prior Publication Data

US 2013/0057433 A1 Mar. 7, 2013

(30) Foreign Application Priority Data

Sep. 5, 2011 (GB) .................................. 1115312.9

(51) Int. Cl.
*H04B 7/08* (2006.01)
*H04B 17/309* (2015.01)

(52) U.S. Cl.
CPC .............. *H04B 7/086* (2013.01); *H04B 7/0842* (2013.01); *H04B 7/0865* (2013.01); *H04B 17/309* (2015.01)

(58) Field of Classification Search
CPC ..... H04B 7/0857; H04B 7/0865; H04B 7/086
See application file for complete search history.

(56) References Cited

U.S. PATENT DOCUMENTS

| 5,752,168 | A | * | 5/1998 | Monot et al. | ............... | 455/67.13 |
|---|---|---|---|---|---|---|
| 5,844,951 | A | * | 12/1998 | Proakis et al. | ................ | 375/347 |
| 6,115,409 | A | * | 9/2000 | Upadhyay et al. | ............. | 375/144 |
| 8,005,060 | B2 | * | 8/2011 | Na | .......................... | H04B 7/086 342/368 |
| 2001/0026197 | A1 | * | 10/2001 | Tomisato et al. | ................ | 333/18 |
| 2003/0214881 | A1 | | 11/2003 | Yang | | |
| 2006/0208945 | A1 | * | 9/2006 | Kolanek | ......................... | 342/377 |
| 2007/0178862 | A1 | * | 8/2007 | Winters et al. | ................. | 455/135 |
| 2009/0048824 | A1 | * | 2/2009 | Amada | ............................ | 704/10 |

FOREIGN PATENT DOCUMENTS

| JP | 2010145068 | 1/2010 |
|---|---|---|
| WO | 2011060058 A1 | 5/2011 |
| WO | 2011091642 | 8/2011 |

OTHER PUBLICATIONS

Extended European Search Report in EP12182379.3-1855 dated Sep. 17, 2014.
Search Report Under Section 17 in GB1115312.9 dated Dec. 22, 2011.

* cited by examiner

*Primary Examiner* — Gregory C Issing
(74) *Attorney, Agent, or Firm* — Banner & Witcoff, Ltd.

(57) ABSTRACT

A method for detecting signals using an adaptive transducer arrangement, the arrangement including a transducer array having a plurality of transducers, a beamformer, and an energy detector, the method comprising: determining weights to be applied by the beamformer to signals emitted from each transducer in order to maximize a performance metric; applying the determined weights to the signals emitted from each transducer; measuring the energy received at the energy detector; comparing the measured energy with a predetermined value and based on said comparison determining whether or not one or more signals are present.

20 Claims, 4 Drawing Sheets

US 9,240,832 B2

METHOD AND APPARATUS FOR SIGNAL DETECTION

FIELD

The present disclosure relates to a method and an apparatus for detecting signals. In particular, it relates to a method of and apparatus for using a transducer array and an adaptive beamformer to detect signals.

BACKGROUND

In the field of signal detection, the key problem which must be solved, is how to distinguish between noise alone, and the presence of one or more signals together with noise. This is a well known problem and many methods and devices are known for solving it. Conventional beamformers have been used to provide a more sensitive solution to the signal detection problem. However, they are typically used in the traditional manner of forming a directional beam and looking for signals in a particular direction. Spatial diversity methods which use multiple transducers have also been previously proposed. Neither of these techniques provides optimum energy detection sensitivity.

SUMMARY

In a first aspect, the present disclosure provides a method for detecting signals using an adaptive transducer arrangement, the arrangement including a transducer array having a plurality of transducers, a beamformer, and an energy detector, the method comprising: determining weights to be applied by the beamformer to signals emitted from each transducer in order to maximise a performance metric; applying the determined weights to the signals emitted from each transducer; measuring the energy received at the energy detector; comparing the measured energy with a predetermined value and based on said comparison determining whether or not one or more signals are present.

In a second aspect, the present disclosure provides a signal detection apparatus, comprising: a transducer array having plurality of transducers; a beamformer for applying weights to signals emitted from each transducer; an energy detector for measuring the energy of the combined signals received from the beamformer; a processor; wherein the beamformer is further for determining the weights to apply to the signals emitted from the transducers in order to maximise a performance metric; the processor is for comparing the measured energy with a predetermined value and determining, based on said comparison, whether or not one or more signals are present.

Further features are provided in the appended claims and accompanying description.

BRIEF DESCRIPTION OF THE DRAWINGS

The present disclosure will now be described by way of example only and with reference to the accompanying drawings, in which.

DETAILED DESCRIPTION

Figure 1:
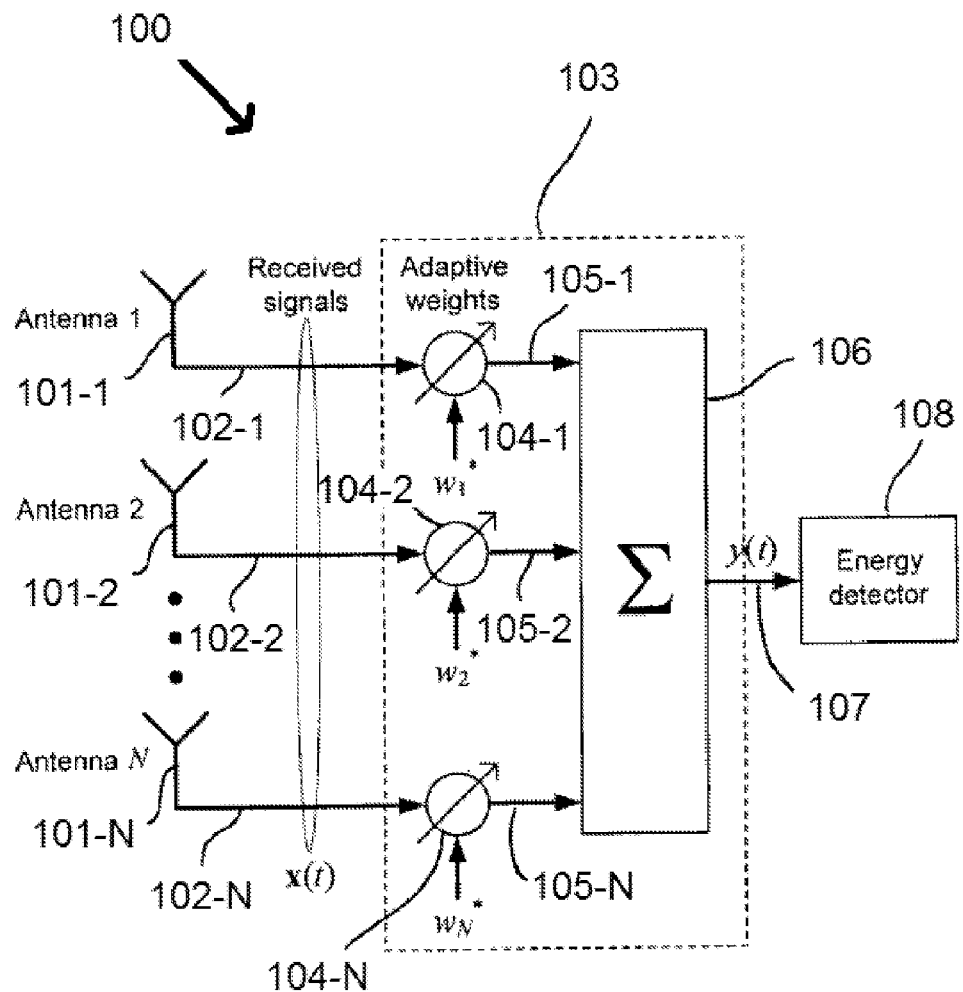
FIG. 1 shows an antenna array arrangement according to an embodiment of the present disclosure.

FIG. 1 shows an adaptive antenna array 100 in accordance with an embodiment of the disclosure. The adaptive antenna array 100 includes a plurality of antennas 101. In this embodiment, the adaptive antenna array 100 includes antenna 101-1, antenna 101-2 through to antenna 101-N. Each antenna 101 is connected to an antenna output line 102. In the present example, antenna 101-1 is coupled to output line 102-1, antenna 101-2 is coupled to output line 102-2 and antenna 101-N is coupled to output line 102-N.

The adaptive antenna array 100 also includes a beamformer 103. The beamformer 103 includes gain and phase adjusters 104. In particular, the beamformer 103 includes gain and phase adjusters 104-1, 104-2 through to 104-N. Each of the respective antenna output lines 102 is connected to a respective gain and phase adjuster 104. The beamformer 103 is arranged to apply adaptive complex weights to the antenna signals using the gain and phase adjusters 104. This will be described in more detail below. The beamformer 103 also includes gain and phase adjuster outputs 105. In this example, the array includes gain and phase adjuster outputs 105-1, 105-2 through to 105-N. Each of the respective gain and phase adjusters 104 is coupled to a respective gain and phase adjuster output 105.

The beamformer 103 also includes the summing circuit 106. The summing circuit 106 is arranged to sum the signals which are output from the gain and phase adjusters 104. The adaptive antenna array 100 includes a summation circuit output 107 which is coupled to the summing circuit 106. Finally the adaptive antenna array 100 includes an energy detector 108 which is coupled to the summation circuit output 107.

Figure 2:
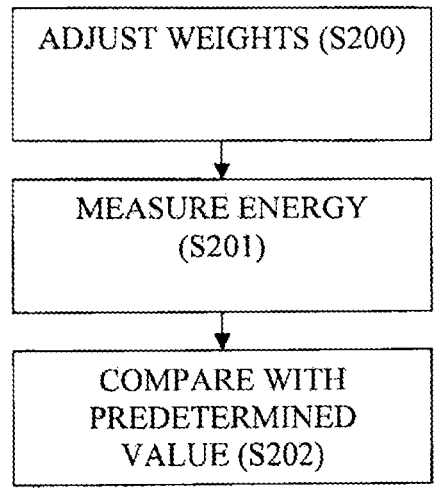
FIG. 2 shows a method in accordance with an embodiment of the disclosure.

Before describing the operation of the adaptive antenna array 100 in detail, a brief overview of the process will be described in connection with FIG. 2. The process includes three main steps. The first step is to determine the weights to apply to the gain and phase adjusters 104 (S200). Following this, the energy detector 108 measures the energy at its input (S201). Finally, the measured energy is compared with a predetermined value to determine whether or not one or more signals is present (S202). The process will now be described in more detail.

Figure 3:
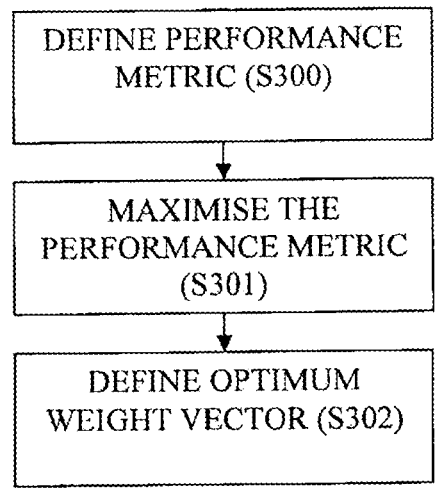
FIG. 3 shows a method of optimising a weight vector in accordance with a further embodiment of the disclosure.

Prior to energy detection, the array 100 must be set up in order to maximise a performance metric at the input to the energy detector 108. In order to achieve this, the weights applied by the gain and phase adjusters 104 must be established. This process will be described with reference to FIG. 3.

For the N element array shown in FIG. 1, the received signals, $x(t) \in C^{N \times 1}$, are modelled as:

$$x(t) = As(t) + n(t)$$

where $A \in C^{N \times K}$ is the array manifold matrix, $s(t) \in C^{K \times 1}$ is the received signals vector, and $n(t) \in C^{N \times K}$ is the noise vector. As shown in FIG. 1, the received signals are the signals present at the outputs of the antennas 101. The model accounts for K co-channel signals simultaneously arriving at the array 100. Note that the antenna array 100 may have an arbitrary layout. There are no restrictions on the positions of the antennas 101. Accordingly, the array manifold matrix does not need specifying in this model.

Without loss of generality, the model represents the received signals at complex baseband. For the purposes of this embodiment, it is assumed that the band of interest has already been mixed down from the carrier frequency. It is also assumed that the baseband received signal has been pre-filtered by a low-pass filter to limit the average noise power. The noise vector models both externally generated noise, as well as noise generated within the system, such as thermal noise. The noise may be spatially correlated.

The signal at the output of the beamformer is given by:

$$y(t) = w^H x(t)$$

where $w = [w_1, w_2, \ldots, w_N]^T \in \mathbb{C}^{N \times 1}$ is the complex weight vector containing all N adaptive weights. As shown in FIG. 1, y(t) is the signal at the output of the summation circuit 106.

As noted above, in order to detect one or more signals, a performance metric must be used. The proposed performance metric for the adaptive beamformer 103 prior to energy detection is defined as: the ratio of the total signals plus noise power to the total noise power at the beamformer 103 output (S300). This is expressed as $$\lambda = \frac{E\{|y(t)|^2\}}{E\{|w^H n(t)|^2\}} = \frac{w^H R_x w}{w^H R_n w}$$

where the received signal covariance matrix is defined as $R_x = E\{x(t)x(t)^H\}$ and $R_n = E\{n(t)n(t)^H\}$ is the noise covariance matrix.

Maximizing the performance metric (S301) with respect to w $$\frac{\partial \lambda}{\partial w^*} = \frac{w^H R_n w R_x w - w^H R_x w R_n w}{(w^H R_n w)^2} = 0$$

which simplifies to $$R_x w - \left(\frac{w^H R_x w}{w^H R_n w}\right) R_n w = 0$$

Substituting for $\lambda$ we obtain a generalized eigenvector equation $$R_x w = \lambda R_n w$$

So the optimum weight vector is equal to the generalized eigenvector associated with the maximum generalized eigenvalue of the matrix pencil $(R_x, R_n)$.

To calculate this optimum weight vector, estimates of both $R_x$ and $R_n$ are required. Matrix $R_x$ is estimated by directly taking the expectation of the outer product of the received signals vector x(t) with itself over a suitable averaging period. $R_n$ may be obtained by estimating $R_x$ when it is known that no signals are present, because in the absence of any signals $R_n = R_x$. Alternatively, the expectation of the outer product of the received signals vector with itself can be calculated for unoccupied adjacent frequency channels, and then the elements of the covariance matrices thus generated can be interpolated into the frequency channel of interest to provide an estimate of $R_n$. Finally, if direct measurement is not feasible, then $R_n$ can be estimated by modelling the noise characteristics of the receiver equipment and the external noise environment.

Accordingly, for a given set of signal data, we are able to determine the optimum weight vector (S302).

Figure 4:
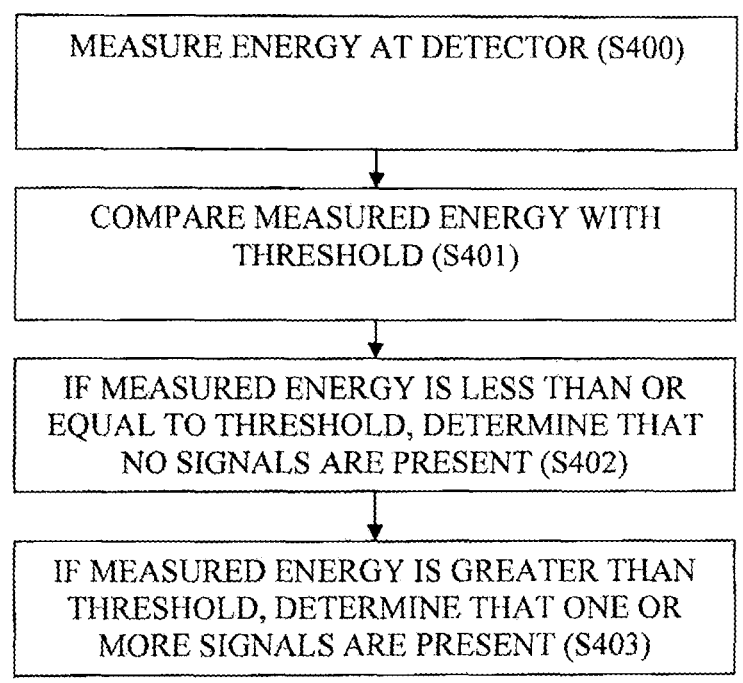
FIG. 4 shows a method of signal detection in accordance with an embodiment of the disclosure.

Following determination of the optimum weight vector, the weights are applied to the same set of signal data. Accordingly, the ratio of the total power of the received signals plus noise to the total noise power arriving at the energy detector is maximised. The process of energy detection with be described with reference to FIG. 4.

For an energy based signal detector, we need to choose between the following two hypotheses:

$H_0$: The signal at the beamformer output y(t) is noise alone.
$H_1$: y(t) consists of one or more signals plus noise.

The test statistic for the energy detector, V, is equal to the square of the beamformer 103 output signal integrated over a finite time interval T:

$$V = \frac{1}{T} \int_t^{t+T} |y(t)|^2 \, dt \approx w^H R_x w$$

A practical energy detection threshold should be proportional to the noise power at the output of the beamformer 103, which is given by:

$$\gamma = k w^H R_n w$$

where k is a scalar which may be used to adjust the false alarm rate. Consequently, the detection test hypotheses can now be expressed as:

$$H_0 : V \leq \gamma$$

$$H_1 : V > \gamma$$

In other words, if the measured energy is greater than the energy due to noise, then one or more signals may assumed to be present. The first step in the process is to measure V at the energy detector 108 (S400). V is then compared against $\gamma$, which has been determined in advance (S401). If $V \leq \gamma$ then it is determined that the beamformer output 103 is noise alone (S402). If $V > \gamma$ then it is determined that the beamformer output 103 is noise plus one or more signals (S403).

This adaptive array energy detector provides up to $10 \log_{10} N$ dB coherent gain and a maximum of N orders of diversity. Furthermore, if some of the noise is external to the detection system and is correlated between the antenna elements, then the beamformer 103 described above will act to cancel the correlated noise and further gains in detection sensitivity are possible.

Of course, this is only possible if a good estimate of $R_n$ is available for the generalized eigenvector calculation. If only a poor estimate of $R_n$ is available then a different approach using another performance metric (which is not dependent on $R_n$) can provide better results. In a second embodiment, the ratio of the total signals plus noise power at the beamformer 103 output to the norm of the weight vector is optimized:

$$\lambda' = \frac{E\{|y(t)|^2\}}{\|w\|^2} = \frac{w^H R_x w}{w^H w}$$

To maximize $\lambda'$ the following standard eigenvector equation needs to be solved:

$$R_x w = \lambda' w$$

This time the optimum weight vector is equal to the eigenvector associated with the maximum eigenvalue of $R_x$. The test statistic and detection threshold are then calculated as for the first version of this adaptive array energy detector. This simplified version of the adaptive array energy detector provides up to $10 \log_{10} N$ dB coherent gain and a maximum of N orders of diversity, but does not act to cancel any spatially correlated noise which might be present.

Figure 5:
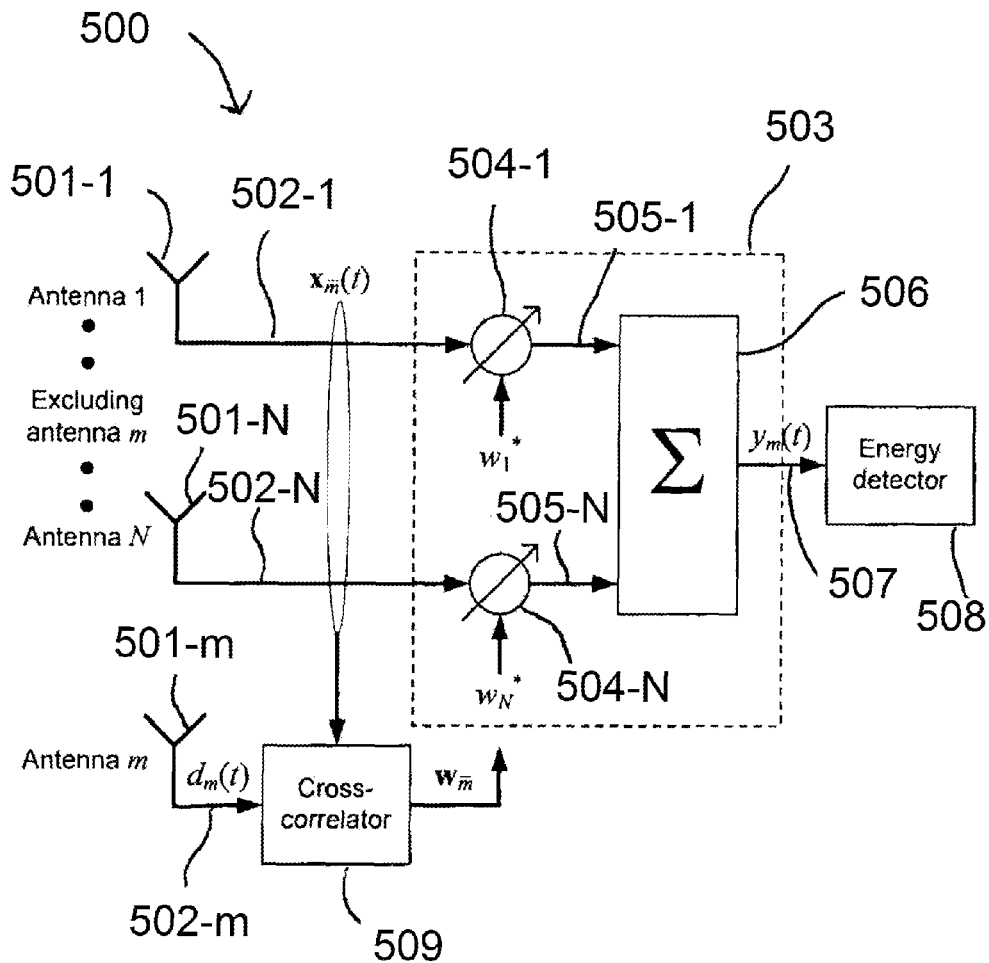
FIG. 5 shows an antenna array arrangement according to a further embodiment of the present disclosure.

A third embodiment of the present disclosure will now be described with reference to FIG. 5. FIG. 5 shows an adaptive antenna array 500 in accordance with the third embodiment of the disclosure. The adaptive antenna array 500 includes a plurality of antennas 501. The array includes N antennas, as in the first embodiment. The array 500 includes antenna 501-1 through to antenna 501-N. In this embodiment, one of the antennas is designated as antenna 501-$m$ which is used as a reference antenna. In FIG. 5, antenna 501-$m$ is shown as a separate antenna, but it is in fact one of the N antennas of the array 500. Each antenna 501 is connected to an antenna output line 502. In the present example, antenna 501-1 is coupled to output line 502-1 and antenna 501-N is coupled to output line 502-N. Antenna 501-$m$ is coupled to output line 502-$m$.

The adaptive antenna array 500 also includes a beamformer 503. The beamformer 503 includes gain and phase adjusters 504. In particular, the beamformer includes gain and phase adjusters 504-1 through to 504-N. In this embodiment, antenna 501-$m$ is not coupled to the beamformer 503, and hence the output line 502-$m$ is not coupled to a gain and phase adjuster. Each of the respective antenna output lines 502 is connected to a respective gain and phase adjuster 504, except for output line 502-$m$. The beamformer 503 is arranged to apply adaptive weights to the antenna signals using the gain and phase adjusters 504. This will be described in more detail below. The beamformer 503 also includes gain and phase adjuster outputs 505. In this example, the array includes gain and phase adjuster outputs 505-1 through to 505-N. Each of the respective gain and phase adjusters 504 is coupled to a respective gain and phase adjuster output 505. In particular, gain and phase adjuster 504-1 is coupled to output 505-1 and gain and phase adjuster 505-N is coupled to output 505-N.

The output of antenna 501-$m$ is fed to cross correlator 509, via line 502-$m$. In practise, the cross correlator may be implemented in software. As will be described in more detail below, the cross correlator cross-correlates the output of the antenna 501-$m$ and the outputs of the other antennas in order to determine a weight vector to apply to the gain and phase adjusters 504.

The beamformer 503 also includes the summing circuit 506. The summing circuit is arranged to sum the signals which are output from the gain and phase adjusters 504. The array 500 includes a summation circuit output 507 which is coupled to the summing circuit 506. Finally the array 500 includes an energy detector 508 which is coupled to the summation circuit output 507.

The first stage in the process is to determine the adaptive weight vector for a given set of data. Starting with the standard received signal model for an N element array, the array is partitioned so that $d_m(t)$ is the signal from the $m^{th}$ array element and $x_{\bar{m}}(t) \in C^{(N-1)\times 1}$ is the signal vector excluding the $m^{th}$ array element. Consequently, a subarray is formed:

$$x_{\bar{m}}(t) = A_{\bar{m}} s(t) + n_{\bar{m}}(t)$$

where $A_{\bar{m}}$ is the array manifold matrix with its $m^{th}$ row removed, and $n_{\bar{m}}(t)$ is the noise vector with its $m^{th}$ element removed. Furthermore:

$$d_m(t) = s^T(t) a_m + n_m(t)$$

where $a_m$ is the $m^{th}$ column of $A^T$ and $n_m(t)$ is the $m^{th}$ element of the noise vector.

We now consider $d_m(t)$ to be the reference signal and $x_{\bar{m}}(t)$ to be our new observation vector. Forming the cross-correlation vector between these signals:

$$r_{x_{\bar{m}} d_m} = E\{x_{\bar{m}}(t) d_m^*(t)\}$$

The subarray beamformer weight vector is then set to:

$$w_{\bar{m}} = \frac{r_{x_{\bar{m}} d_m}}{\| r_{x_{\bar{m}} d_m} \|}$$

so that the signal at the output of the beamformer is:

$$y_m(t) = w_{\bar{m}}^H x_{\bar{m}}(t)$$

The test statistic which is thresholded to decide whether signal energy is present is then given by:

$$V_m = \frac{1}{T} \int_t^{t+T} |y_m(t)|^2 \, dt$$

and the detection threshold is:

$$\gamma_m = k w_{\bar{m}}^H R_{n_{\bar{m}}} w_{\bar{m}}$$

where $R_{n_{\bar{m}}} = E\{n_{\bar{m}}(t) n_{\bar{m}}(t)^H\}$ is the noise covariance matrix for the subarray excluding the $m^{th}$ element.

To understand the effect of this beamformer note that $d_m(t)$ contains a linear combination of all of the signals incident upon the receiving array. Consequently, by forming $w_{\bar{m}}$ with $d_m(t)$ as a reference signal, this weight vector will attempt to coherently combine the spatial channels to maximize the power of the linear combination of received signals at the beamformer output. In effect, this is a spatial matched filter for the combined signals received by the array, and the performance metric which is implicitly optimized at the beamformer output is the total power of the received signal components which are present within the reference signal. The result is to increase the detection sensitivity by a maximum theoretical $10 \log_{10}(N-1)$ dB. Additionally, during small-scale fading conditions, up to N−1 orders of diversity are available. Although the theoretical performance of this adaptive array detector is slightly worse than for the previously described approach, it does have the benefit of simplicity of implementation.

While the above examples have been described in the context of radio signals and an adaptive antenna array, the disclosure is also applicable to acoustic or sonar applications using arrays of microphones or hydrophones. The term "transducer" is used to refer to an antenna, microphone, hydrophone, or any other suitable sensor.

Glossary of Mathematical Notation

A summary of the mathematical notation used in this specification is provided below:
C The field of complex numbers
a(t) Scalar signal
a(t) Vector signal
A Matrix
E{•} Expectation
(•)* Complex conjugate
(•)$^T$ Transpose
(•)$^H$ Hermitian (complex conjugate) transpose

The invention claimed is:
1. A method comprising:
receiving, with a beamformer, signals emitted from each of a plurality of transducers in an adaptive transducer arrangement;

determining weights to be applied by the beamformer to signals emitted from each transducer in order to maximise a performance metric based on a total signals plus noise power;

applying, with the beamformer, the determined weights to the signals emitted from each transducer and summing the weighted signals with a summing circuit;

measuring energy received at an energy detector from the summing circuit; and comparing the measured energy with a predetermined value, which is an energy detection threshold, and based on said comparison determining whether or not one or more signals are present.

2. A method according to claim 1, wherein said step of determining weights includes a step of determining an optimum weight vector.

3. A method according to claim 2, wherein the step of determining the optimum weight vector, includes a step of defining the performance metric.

4. A method according to claim 3, wherein the performance metric is defined at an input to the energy detector.

5. A method according to claim 2, wherein the performance metric is a ratio of total signals plus noise power to noise power.

6. A method according to claim 5, wherein the performance metric may be expressed as $$\lambda = \frac{w^H R_x w}{w^H R_n w},$$

wherein $\lambda$ is the performance metric, w is a weight vector comprising the weights, $R_x$ is a received signal matrix, and $R_n$ is a noise covariance matrix.

7. A method according to claim 6, wherein the performance metric is maximised with respect to w.

8. A method according to claim 7, wherein the optimum weight vector is equal to a generalized eigenvector associated with a maximum generalized eigenvalue of a matrix pencil $(R_x, R_n)$.

9. A method according to claim 2, wherein the performance metric is a ratio of the total signals plus noise power to a norm of the optimum weight vector.

10. A method according to claim 9, wherein the performance metric may be expressed as $$\lambda = \frac{w^H R_x w}{w^H w},$$

wherein $\lambda$ is the performance metric, w is a weight vector comprising the weights, and $R_x$ is a received signal covariance matrix.

11. A method according to claim 10, where in the performance metric is maximised with respect to w.

12. A method according to claim 11, wherein the optimum weight vector is equal to an eigenvector associated with a maximum eigenvalue of $R_x$.

13. A method according to claim 1, wherein said predetermined value is proportional to noise power at an output of the beamformer.

14. A method according to claim 13, wherein the predetermined value is given by $kw^H R_n w$, wherein w is a weight vector comprising the weights, k is a scalar value used to adjust a false alarm rate, and $R_n$ is a noise covariance matrix.

15. A method according to claim 13, wherein if the energy measured at the energy detector is less than or equal to the predetermined value, it is determined that only noise is present.

16. A method according to claim 13, wherein if the energy measured at the energy detector is greater than the predetermined value, it is determined that at least one signal is present.

17. A method according to claim 1, wherein one of said transducers is designated as a reference transducer.

18. A method according to claim 17, wherein the performance metric is a total power of a linear combination of the signals received by said reference transducer.

19. A method according to claim 1, wherein the adaptive transducer arrangement is an adaptive antenna arrangement and the plurality of transducers is a plurality of antennas.

20. A signal detection apparatus, comprising:

a transducer array having plurality of transducers;

a beamformer adapted to apply weights to signals emitted from each transducer;

an energy detector adapted to measure a combined energy of the weighted signals received from the beamformer; and a processor;

wherein the beamformer is further adapted to determine the weights to apply to the signals emitted from the transducers in order to maximise a performance metric based on a total signals power and noise power; and wherein the processor is adapted to compare the measured combined energy with a predetermined energy detection threshold and determine, based on said comparison, whether or not one or more signals are present.

* * * * *